J. BORNHOLDT.
POTATO CUTTING MACHINE.
APPLICATION FILED MAY 19, 1922.
1,432,152.
Patented Oct. 17, 1922.
6 SHEETS—SHEET 2.
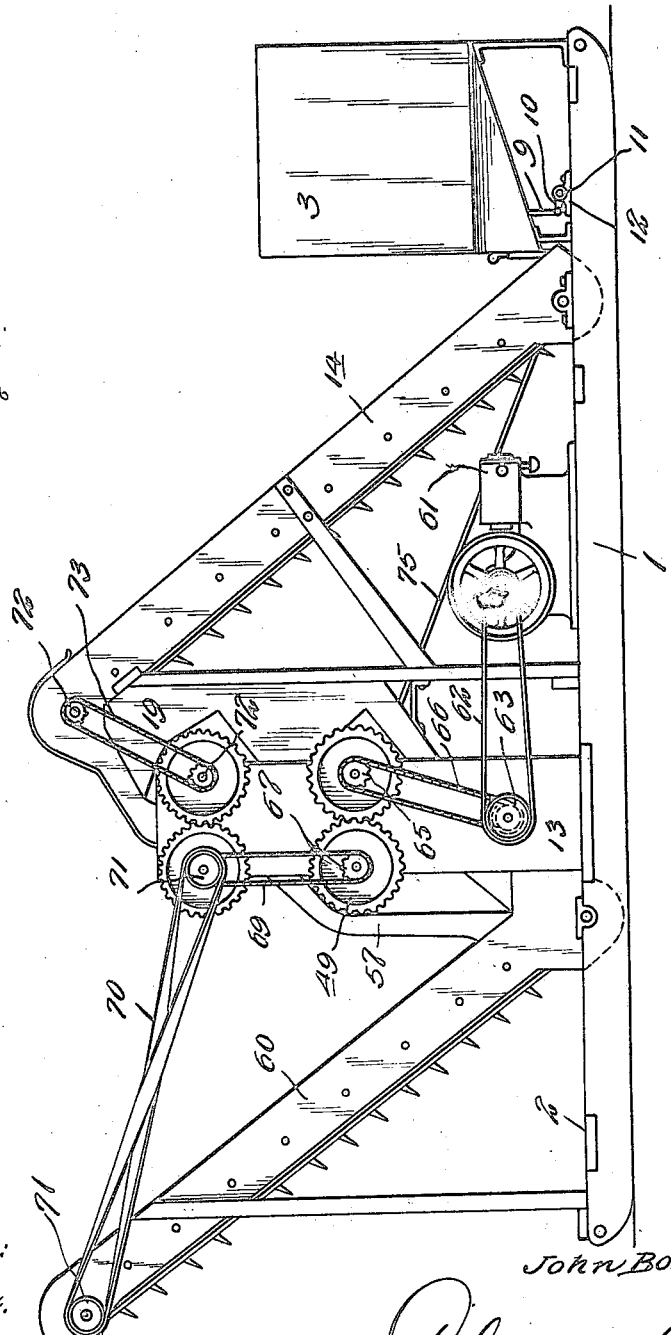
Witnesses:
Inventor
John Bornholdt,
By
Attorney

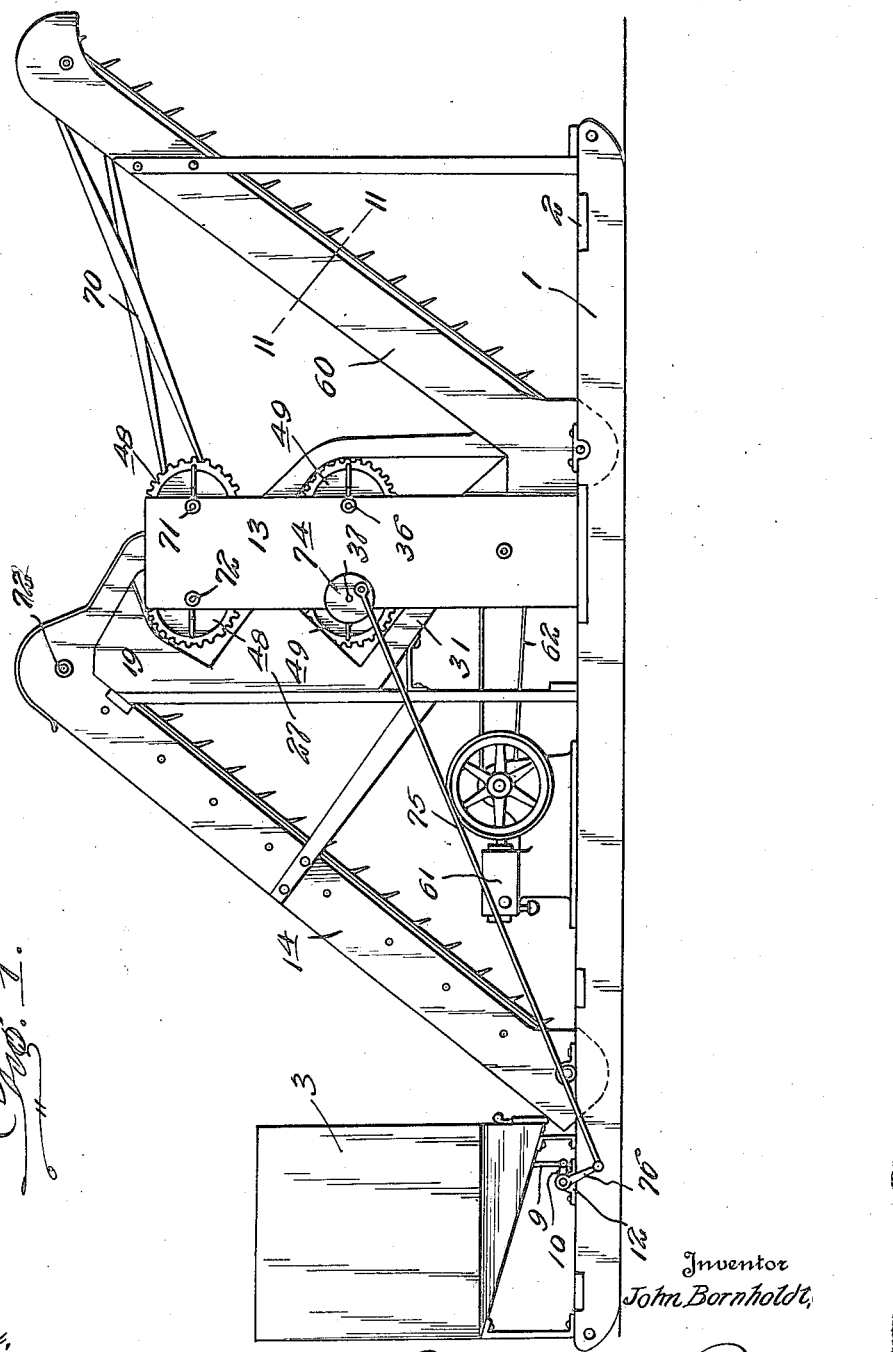

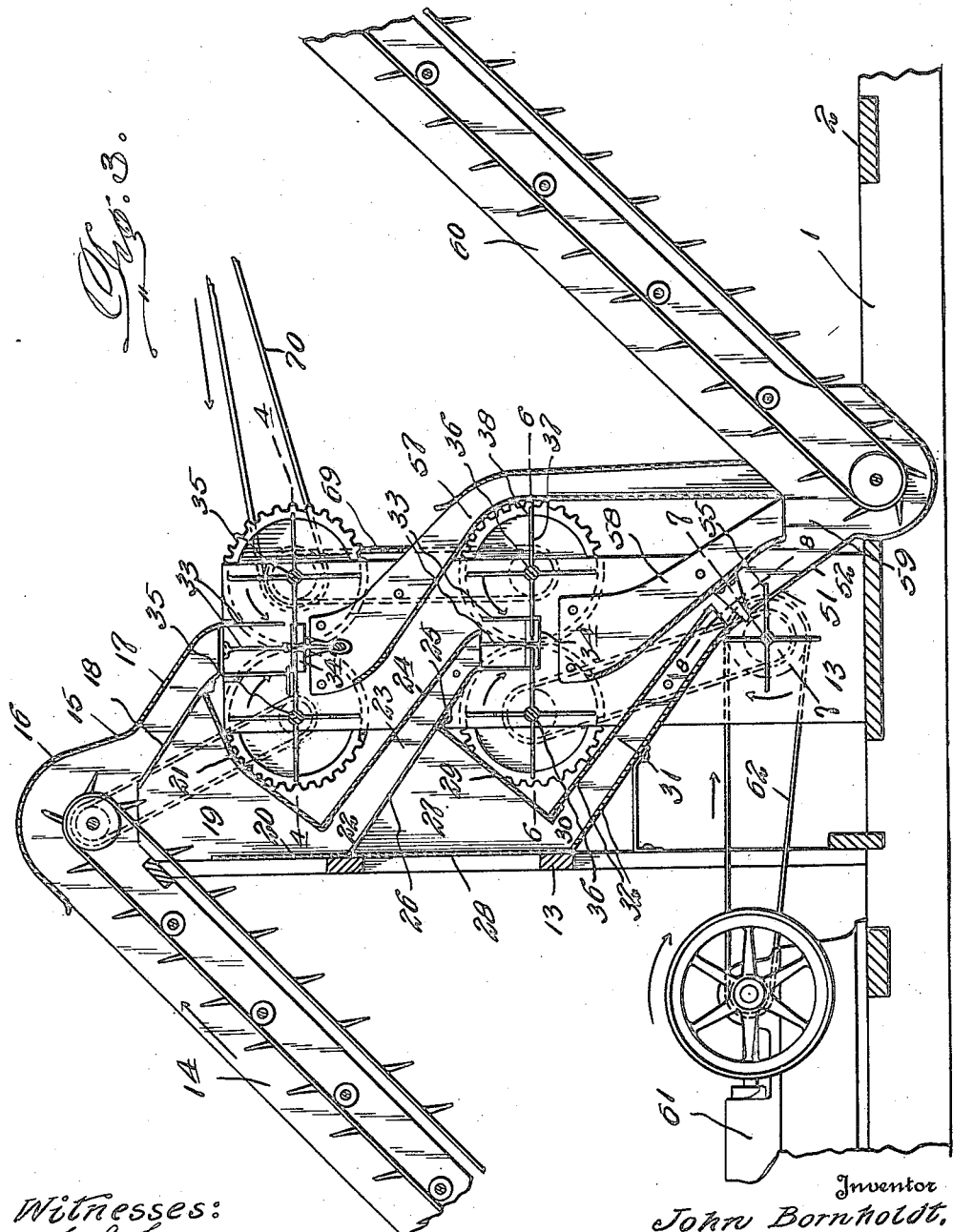

J. BORNHOLDT.
POTATO CUTTING MACHINE.
APPLICATION FILED MAY 19, 1922.

1,432,152.

Patented Oct. 17, 1922.
6 SHEETS—SHEET 4.

Inventor
John Bornholdt,

Witnesses:

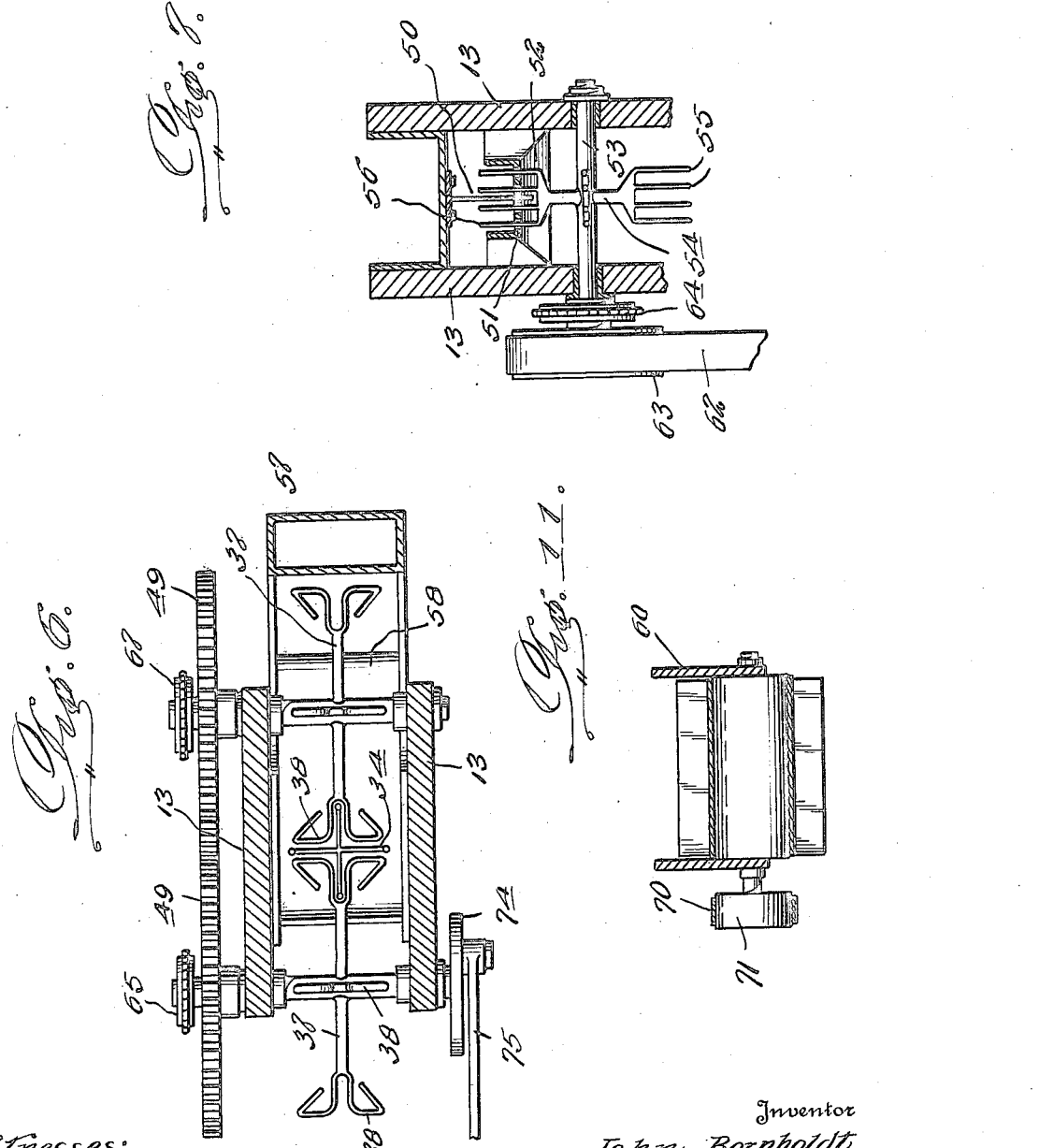

J. BORNHOLDT.
POTATO CUTTING MACHINE.
APPLICATION FILED MAY 19, 1922.
1,432,152.
Patented Oct. 17, 1922.
6 SHEETS—SHEET 6.
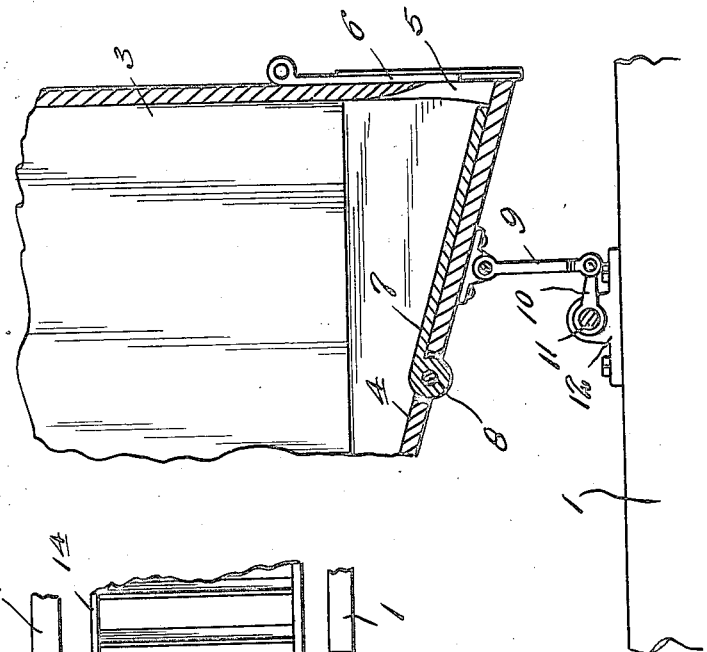
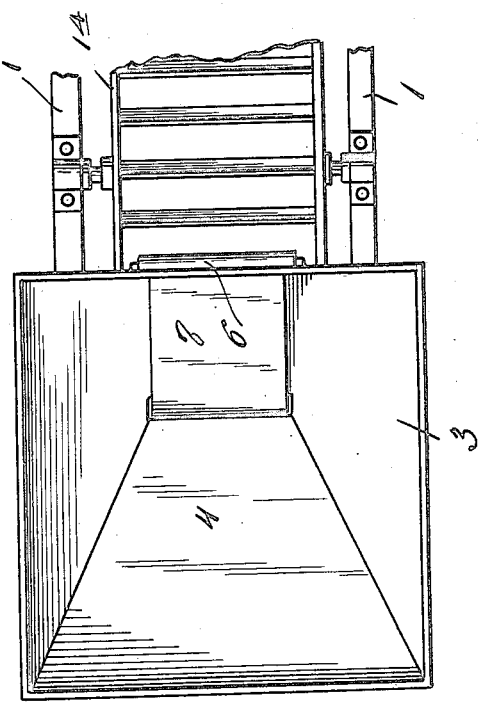
Witnesses:
F. L. Fox,
Hyman Berman
Inventor
John Bornholdt,
By (signature)
Attorney Patented Oct. 17, 1922.

1,432,152

UNITED STATES PATENT OFFICE.

JOHN BORNHOLDT, OF PARK RIVER, NORTH DAKOTA.

POTATO-CUTTING MACHINE.

Application filed May 19, 1922. Serial No. 562,059.

*To all whom it may concern:*

Be it known that I, JOHN BORNHOLDT, a citizen of the United States, residing at Park River, in the county of Walsh and State of North Dakota, have invented new and useful Improvements in Potato-Cutting Machines, of which the following is a specification.

In carrying out the present invention it is my purpose to provide a potato cutting machine wherein the potatoes may be graded and those in the various grades delivered to the respective cutters, and wherein the grading and cutting operations will be automatic, thereby eliminating the necessity of an attendant for the machine while in operation.

It is also my purpose to provide a potato cutting machine wherein the potatoes may be automatically delivered to the grading and cutting mechanism and the cut pototoes automatically removed from the grading and cutting mechanism and discharged into a suitable container.

It is also my purpose to provide a machine of the class described which will embrace the desired features of simplicity, efficiency and durability, wherein the component parts will be so arranged and correlated as to reduce the possibility of derangement to a minimum and wherein the potatoes will be thoroughly and effectively graded and cut.

A further object of my invention is the provision of a machine of the type set forth which will require very little attention and operation, thereby eliminating the necessity of having an attendant at the machine continuously while in operation.

With the above recited objects in view, and others of a like nature, the invention resides in the construction, combination and arrangement of parts set forth in and falling within the scope of the appended claims.

In the accompanying drawings:

Figure 1 is a side elevation of a potato grading and cutting machine constructed in accordance with my invention.

Figure 2 is a view of the other side of the machine.

Figure 3 is a vertical sectional view through the machine.

Figure 4 is a horizontal sectional view on the line 4—4 of Figure 3.

Figure 5 is a sectional view on the line 5—5 of Figure 4.

Figure 6 is a sectional view on the line 6—6 of Figure 3.

Figure 7 is a sectional view on the line 7—7 of Figure 3.

Figure 8 is a sectional view on the line 8—8 of Figure 3.

Figure 9 is an enlarged plan view of the hopper and the lower end of the conveyor associated therewith.

Figure 10 is an enlarged fragmentary vertical sectional view through the discharge end of the hopper.

Figure 11 is a sectional view through the discharge conveyor on the line 11—11 of Figure 1.

Referring now to the drawings in detail, 1—1 indicate horizontal skids spaced apart in parallel relation and having their lower edges adapted to engage the ground and their upper edges connected to each other by means of cross bars 2. These skids and cross bars constitute the base of my machine, and mounted upon such base at one end thereof is a hopper 3 adapted to receive the potatoes to be cut. The bottom of the hopper 3 is inclined downwardly as at 4 and has the end wall thereof at the lower end of the inclined bottom formed with a discharge opening 5 that is controlled by a vertically movable gate 6 by means of which the discharge of the potatoes from the hopper may be regulated.

The lower portion of the inclined wall 4 of the hopper contiguous to the discharge opening 5 is equipped with an agitator plate 7 pivoted as at 8 and connected with the upper end of a vertical link 9. The lower end of the link 9 is connected with a rocker arm 10 fixed upon a transverse shaft 11 journaled in bearings 12 carried by the respective skids 1 below the hopper. This shaft 11 is rocked in a manner presently described and in the rocking of the shaft 11 motion is transmitted to the agitator plate 7, so as to agitate the potatoes in the lower end of the hopper and prevent choking of the discharge opening 5.

Uprising from the base at the center thereof is a housing 13 of suitable construction, and arranged upon the base is an inclined conveyor 14 of appropriate construction having its lower end in communication with the discharge opening 5 of the hopper 3, as clearly illustrated in Figures 1 and 2 of the drawings, and its upper end in open communication with the top of the housing 13, as shown in Figure 3 of the drawings. In the present instance this conveyor is of the endless belt type, and in the operation thereof the potatoes that flow through the discharge opening 5 of the hopper are carried by the upper run of the conveyor into the top of the housing 13.

The upper end of the housing 13 is equipped with a hood 15 that embodies a curved portion 16 that surrounds the discharge end of the conveyor and an inclined portion 17 that extends from a point approximately centrally of the housing toward the side of the housing opposite from the conveyor, as shown in Figure 3. Secured within the housing parallel with the inclined portion 17 of the hood is a grading screen 18 having openings therein of such dimensions as to permit the small potatoes to fall through and the larger potatoes to flow down the passageway formed by the side walls of the housing, the grading screen and the inclined portion 17 of the hood.

Beneath the grading screen 18 is a hopper-like chamber 19 formed by the side walls of the housing 13 and transverse partitions 20, 21 that extend across the housing, the partition 20 being vertically disposed and the partition 21 inclined. The lower ends of these partitions that form the hopper chamber 19 terminate in a restricted passage 22, and communicating with the passage 22 is an inclined chute 23 formed by the side walls of the housing 13, an inclined top plate 24 extending across the housing and an inclined bottom plate 25 extending across the housing below and parallel with the plate 24. The major portion of the plate 25 at the upper end thereof is formed with grading openings 26 of less diameter than the openings in the grading screen 18, and through these grading openings 26 pass comparatively small potatoes, while the remaining potatoes pass down the chute 23 toward the discharge end thereof.

Beneath the grading openings 26 in the chute 23 is a hopper-like chamber 27 formed by the side walls of the housing 13 and a vertical partition 28 and an inclined partition 29 extending across the housing and having the end edges thereof suitably secured to the side walls of the housing. The upper end of the inclined partition 29 is appropriately connected to the bottom wall of the chute 23, while the lower end of the inclined partition 29 terminates a short distance from the lower end of the partition 28 to provide a restricted outlet 30 and connected with this outlet 30 is a discharge chute 31 formed of inclined top and bottom plates 32 spaced apart in parallelism and extending across the housing 13, the end edges of the plates 32 being secured to the side walls of such housing.

At the lower end of the passageway or chute formed by the inclined portion 17 of the hood 15 and at the lower end of the chute 23 are cutter mechanisms respectively. In the present instance each of these mechanisms comprises vertical guide rods 33 arranged in circular series and spaced apart equal distances below the corresponding chute. Below each series of guide rods is a horizontal knife 34 of cross shape in horizontal section having the outer ends of the blades in alinement with the lower ends of the respective guide rods 33 of the set. These knives are suitably supported in proper position and journaled in the side walls of the housing 13 at opposite sides of the upper knife are transverse shafts 35, 35, while cross shafts 36, 36 are journaled in the side walls of the housing 13 at opposite sides, respectively, of the lower knife 34. Fixed to each shaft 35, 35 and 36, 36 are pressure arms 37 that radiate from the shaft and are spaced apart equal distances. Each arm 37 at its outer end is formed with a potato engaging element 38 formed in such manner as to engage the potato and force the same into engagement with the blades of the knife, so as to sever the potato into four pieces in accordance with the number of blades of the knife. The arms on the shafts 35, 35 correspond with each other in number and position and, likewise, the arms on the shafts 36, 36 are similarly arranged so that corresponding arms on the shafts of the respective cutting mechanisms engage the potatoes simultaneously, thereby forcing the potatoes into engagement with the knife with a uniform pressure to insure the proper cutting of the potatoes.

As the potatoes that pass through the upper chute are relatively large, I provide an additional cutter, which in the present case is in the form of a horizontal blade 39, arranged in a plane slightly above that of the top knife 34 and movable back and forth across the path of the potatoes to such knife 34 as shown by the arrows in Figure 4 and in this movement of the blade 39 the potatoes are cut horizontally as well as vertically, thus severing the same into eight parts in this instance. To swing the blade 39 the same is pivoted upon a vertical pin 40 fixed in a slot 41 formed in the adjacent side wall of the housing 13 and is formed with an arm 42 connected through a pin and slot connection 43 with a horizontally slidable rod 44 mounted in bearings 45 carried by the side wall of the housing 13 behind the slot 41. The ends of the rod 44 are formed with with beads 46 engageable respectively with double cams 47 fixed on the shafts 35, 35. Also fixed on the shafts 35, 35 are intermeshing gear wheels 48, 48 respectively by which motion is transmitted from one shaft to the other in order to properly rotate the arms carrying the potato engaging elements.

The shafts 36, 36 are also provided with intermeshing gear wheels 49, 49 by which proper motion is transmitted from one to the other.

Below the discharge end of the chute 31 of the hopper 27 that receives the relatively small potatoes is a cutter organization comprising in the present instance a knife blade 50 extending across the path of the potatoes from the chute 31 and suitably secured at its upper end and having its lower end projecting through a slot 51 formed in a plate 52 arranged contiguous to the bottom wall 32 of the chute 31 and forming in effect, a continuation of said wall. Below the plate 52 is a cross shaft 53 journaled in bearings carried by the side walls of the housing 13 and fixed to this shaft 53 are arms 54 radiating from the shaft and spaced apart equal distances around the shaft. The outer ends of the arms 54 are provided with fingers 55 that work through slots 56 respectively formed in the plate 52 at opposite sides of the slot 51 and in the rotation of the shaft 53 these fingers force the potatoes from the chute 31 into engagement with the knife 50 thereby cutting the relatively small potatoes that flow from the hopper chamber 27.

Leading from the cutting mechanism below the upper chute or passage and the chute 23 and leading from the bottom cutter organization are chutes or passages 57, 58 and 59, respectively, and the lower end of these chutes 57, 58 and 59 discharge into the lower end of a conveyor 60 of suitable construction and extending upwardly from the base, the upper end of the conveyor discharging into a suitable receptacle that may be provided for the purpose.

Any suitable means may be provided for driving the machine. In the present embodiment of the invention I employ an engine 61 connected by a belt 62 with a belt pulley 63 on one end of the shaft 53. On the same end of the shaft 53 is a sprocket 64 and on the corresponding end of one shaft 36 is a sprocket 65. Over these sprockets is trained an endless chain 66. On one end of the other shaft 36 is a sprocket 67 over which and a sprocket 68 on the corresponding end of one shaft 35 is trained an endless chain 69. The last named shaft 35 is connected by suitable belt 70 and pulleys 71 with the conveyor 60 to drive the latter while the other shaft 35 drives the conveyor 14 by means of the sprockets 72, and chain 73.

On the free end of one of the shafts 36 is a crank disk 74 connected with a rocker arm 76 on the rock shaft 11 by means of a connecting rod 75. Thus motion may be imparted to the agitator plate 7 in the bottom of the hopper 3.

In practice, potatoes to be cut are deposited in the hopper 3 and are discharged through the opening 5 onto the conveyor 14, from whence they are delivered to the upper end of the housing 13. As the potatoes enter the upper end of the housing and roll down the passageway formed by the inclined portion 17 of the hood and the graded screen 18 which potatoes enter the space between the guide rods of the upper cutting mechanism, while the smaller potatoes fall through the grading screen 18 and into the hopper-like chamber 19. The larger of the potatoes in the hopper-like chamber 19 gravitate down the chute 23 while the smaller potatoes fall through the openings 26 into the hopper-like chamber 27, and all of the potatoes in the chamber 27 gravitate down the chute 31.

As the potatoes enter the upper cutting mechanism the central cutting mechanism and the lower cutting mechanism, the potato engaging elements or fingers force the potatoes past the knives, so as to sever the potatoes, as previously described, while the potatoes in the upper cutting mechanism are also cut transversely by the auxiliary knife blade 39, and all of these potatoes are delivered to the conveyor 60 by means of the chutes leading from the respective cutting organizations.

It will be understood that the engine 61 through the belt 62 drives the shaft 53 and the latter in turn through the shafts, chains and belts hereinbefore described drives all of the movable parts of my apparatus.

While I have herein shown and described one preferred form of my invention by way of illustration, I wish it to be understood that I do not limit or confine myself to the precise details of construction herein shown and described, as modifications and variations may be made within the scope of the claims and without departing from the spirit of my invention.

Having thus described the invention, what is claimed as new, is:—

1. In an organization of the class described, a vertical housing, a conveyor leading into the upper end of the housing to deliver potatoes thereto, a vertical series of cutter mechanisms, and means for grading and delivering potatoes of various sizes to said respective cutter mechanisms.

2. In an organization of the class described, a vertical housing, means for delivering pototatoes to the upper end of said housing, a vertical series of cutter mechanisms within said housing, chutes leading to said cutter mechanisms respectively, grading means associated with said chutes to deliver potatoes of one size to each cutting mechanism by means of the corresponding chute and means for operating each cutter mechanism.

3. In an organization of the class described, a vertical housing, means for delivering potatoes to the upper end of said housing, a vertical series of cutter mechanisms within said housing, chutes leading to said cutter mechanisms respectively, grading means associated with said chutes to deliver potatoes of one size to each cutting mechanism by means of the corresponding chute and means for operating each cutter mechanism, each cutter mechanism embodying a knife in the path of movement of the potatoes and means engaging the potatoes to force the same into engagement with the knife to sever the potatoes.

4. In an organization of the class described, a vertical housing, means for delivering potatoes to the upper end of said housing, a vertical series of cutter mechanisms within said housing, chutes leading to said cutter mechanism respectively, grading means associated with said chutes to deliver potatoes of one size to each cutting mechanism by means of the corresponding chute, means for operating each cutter mechanism, each cutter mechanism embodying a knife in the path of movement of the potatoes, means engaging the potatoes to force the same into engagement with the knife to sever the potatoes, and an auxiliary knife working at right angles to the first mentioned knife of the cutter mechanism receiving the largest potatoes to sever such potatoes transversely.

5. In an organization of the class described, a vertical housing, means for delivering potatoes to the upper end of said housing, a vertical series of cutter mechanisms within said housing, chutes leading to said cutter mechanism respectively, grading means associated with said chutes to deliver potatoes of one size to each cutting mechanism by means of the corresponding chute, means for operating each cutter mechanism, each cutter mechanism embodying a knife in the path of movement of the potatoes, means engaging the potatoes to force the same into engagement with the knife to sever the potatoes, an auxiliary knife working at right angles to the first mentioned knife of the cutter mechanism receiving the largest potatoes to sever such potatoes transversely, and means for swinging said transverse knife back and forth across the path of movement of the potatoes.

6. In an organization of the class described, a vertical housing, a conveyor leading into the upper end of the housing to deliver potatoes thereto, a vertical series of cutter mechanisms, means for grading and delivering potatoes of various sizes to said respective cutter mechanisms, a hopper communicating with said delivery means to deliver potatoes thereto, and means for agitating the potatoes in said hopper to prevent choking thereof.

7. In an organization of the class described, a vertical housing, a conveyor leading into the upper end of the housing to deliver potatoes thereto, a vertical series of cutter mechanisms, means for grading and delivering potatoes of various sizes to said respective cutter mechanisms, a hopper communicating with said delivery means to deliver potatoes thereto, means for agitating the potatoes in said hopper to prevent choking thereof, and a conveyor in communication with all of said cutter mechanisms to carry the cut potatoes away from said housing.

In testimony whereof I affix my signature.

JOHN BORNHOLDT.